UNITED STATES PATENT OFFICE.

WILLIAM CROSS SELLAR, OF LONDON, ENGLAND.

METHOD OF MAKING SILICO-FLUORIDS.

SPECIFICATION forming part of Letters Patent No. 666,980, dated January 29, 1901.

Application filed July 18, 1900. Serial No. 24,075. (No specimens.)

*To all whom it may concern:*

Be it known that I, WILLIAM CROSS SELLAR, gentleman, a subject of the Queen of Great Britain, residing at 119ᴬ Mount street, Berkeley Square, London, England, have invented new and useful Improvements in Treatment of Calcium Fluorid or Fluor-Spar for the Production of Silico-Fluorids, of which the following is a specification.

This invention relates to the treatment of calcium fluorid or fluor-spar for the production of silico-fluorids; and it consists, essentially, in fusing the calcium fluorid or fluor-spar together with dry calcium chlorid, (the proportions of about two parts, by weight, of anhydrous calcium chlorid to one part fluor-spar gives good results,) the resulting cooled mass being then ground in the dry state and preferably as finely as possible and mixed or ground with silica (in excess over the theoretical quantity necessary to form silico-fluorid) or a suitable silicate, such as calcium silicate. I have found by experiments that the yield of silico-fluorids is much greater when calcium chlorid is added than when this addition is dispensed with, and within certain limits, at least, an increase of the calcium chlorid relatively to the calcium fluorid (fluor-spar) increases the production of silico-fluorid. The silica should preferably be soft silica—*i. e.*, not dense, like quartz—precipitated silica which has not been highly heated after drying being most suitable. Strong commercial hydrochloric acid is then added in excess and the mixture heated in a closed vessel until the reaction is sufficiently complete. The whole is then (preferably after being cooled) filtered. The filtrate may be set aside for use over again, as acid with the same or another batch of fused material or any silico-fluoric acid therein contained may be extracted therefrom by an operation separate from that now about to be described. The residue from the filtration is washed with water and filtered, and if the residue from this second filtration still contains fluorin it may be treated (along with a fresh batch of fused material or separately) either by fresh acid or by the first filtrate above mentioned. To the second filtrate is added any suitable soluble salt (potassium or barium chlorid, for instance) which will precipitate a salt of silico-fluoric acid. I have been unable to ascertain positively the reactions occurring during my process. I find, however, that fusion of calcium chlorid with calcium fluorid prior to treatment with hydrochloric acid yields more silico-fluorid than the treatment of a mere dry mixture of said salts with hydrochloric acid. The presence of an excess of calcium chlorid over the fluorid is of further advantage in that it reduces the corrosion of the containing vessel by the fused material. Assuming that the calcium fluorid does not enter into the reaction with hydrochloric acid, the reaction may be hypothetically expressed by either one of the following equations:

$$3CaF_2 + 4HCl + SiO_2 = CaSiF_6 + 2CaCl_2 + 2H_2O$$

or $$3CaF_2 + 6HCl + SiO_2 = H_2SiF_6 + 3CaCl_2 + 2H_2O.$$

I incline to the belief that the first equation correctly expresses the reaction, at least in its main features, as there is a possibility of secondary reactions. This salt can be freed from the calcium chlorid and other salts in solution by filtration and washing, and a fairly-pure calcium chlorid can be recovered from the filtrate for use over again with more calcium fluorid.

The salt of silico-fluoric acid obtained as herein described may be converted into fluorid by well-known means.

I have herein indicated certain proportions of calcium fluorid and calcium chlorid which I have found yield good results; but I do not in any way limit myself thereto, as they may be varied. Speaking generally, I would state that, while retaining the same proportion of hydrochloric acid relatively to the calcium fluorid, the proportion of calcium chlorid relatively to the calcium fluorid might be less than that specified; but I find that the higher the proportion of the calcium chlorid used (which might even exceed that stated, although with doubtful advantage) the less of the silico-fluoric compound will be carried off with the first filtrate, so that the excess acid can be used over again.

I desire it to be understood that by "calcium fluorid" I particularly intend to designate the native fluorid commonly known as "fluor-spar," but that under that term I also include the artificially-produced calcium fluorid.

I claim—

1. In the process of producing silico-fluorids from calcium fluorid or fluor-spar, the step which consists in fusing the calcium fluorid together with calcium chlorid, so as to render the fluor-spar more easily attackable by hydrochloric acid, as specified.

2. In producing silico-fluorids from calcium fluorid or fluor-spar, the process which consists in fusing the calcium fluorid together with calcium chlorid, mixing the resulting cooled mass in a finely-divided state with silicious matter, heating the mixture with strong hydrochloric acid in a closed vessel, as described.

3. In the herein-described process of producing silico-fluorids from calcium fluorid, the process which consists in fusing the calcium fluorid together with calcium chlorid, mixing the resulting cooled mass in a finely-divided state with silicious matter, heating with strong hydrochloric acid in a closed vessel, separating any excess of acid for use over again, extracting from the residue the silico-fluoric compound, precipitating a salt of silico-fluoric acid therefrom by means of a suitable salt, and separating the precipitated salt, substantially as specified.

WILLIAM CROSS SELLAR.

Witnesses:
T. W. KENNARD,
C. J. CLARK.